INVENTORS
Evelyn Berezin Wilenitz
Frank Carmine Marino
Donald Walter Russell
BY
Curtis, Morris, & Safford
ATTORNEYS INVENTORS
Evelyn Berezin Wilenitz
BY Frank Carmine Marino
Donald Walter Russell
Curtis, Morris & Safford
ATTORNEYS

DATA PROCESSING SYSTEM

Filed Dec. 30, 1960 3 Sheets-Sheet 3

INVENTORS
Evelyn Berezin Wilenitz
Frank Carmine Marino
Donald Walter Russell
BY
Curtis, Morris & Safford
ATTORNEYS 3,253,262
Patented May 24, 1966

3,253,262

DATA PROCESSING SYSTEM

Evelyn Berezin Wilenitz, New York, N.Y., and Frank C. Marino, South Norwalk, and Donald W. Russell, Norwalk, Conn., assignors to The Bunker-Ramo Corporation, a corporation of Delaware Filed Dec. 30, 1960, Ser. No. 79,624
2 Claims. (Cl. 340—172.5)

This invention relates to data processing systems. More in particular, this invention relates to methods and means for programmatically controlling the organization of a data processing system in such a way that the system is automatically arranged in the optimum configuration for a given problem. The present invention is particularly applicable to so-called "on-line" data processing systems such as those used for handling the reservation of passenger or cargo space in airplanes or other vehicles, the processing of deposits and withdrawals in savings banks, and the like.

On-line data processing systems have special requirements which cannot be met by the usual "off-line" data processing equipment. For example, an on-line system generally must be operable at random by any one of a number of control stations, e.g., agent sets such as shown in Schmidt Patent No. 2,564,410. The stored information available to the control stations must be large, and yet access must be had thereto quickly. Also, the system must have extremely high reliability since it is a direct part of a commercial operation and any equipment failure may mean a serious monetary loss. Moreover, the system should be capable of quickly changing programs from one type of transaction to another on a random basis, and must be able to handle peak loads efficiently. Still further, an on-line system should be arranged to provide for future growth to meet an expanding volume of traffic, while still maintaining fast response time.

Experience has shown that these requirements can best be met by a multi-processor arrangement, i.e., wherein there are provided several independent data processors each operable with a variety of peripheral terminal equipments such as memory storage devices and input-output units. The system can be arranged to provide a multiplex mode of operation wherein the data processors take turns in answering queries from the control stations (agent sets) with all processors having access to a single common memory system for the required data. In such an arrangement, each processor may be connected through a "seeker" to the control stations, thereby to allow any idle processor to handle the next transaction received from any of the stations. Alternatively, the system may be arranged in a simplex mode, wherein the various processors do different jobs. For example, one processor could be handling the on-line work load while a second processor could be handling off-line work such as payroll processing, etc.

Because of the need for system flexibility, it is necessary to use a large variety of peripheral sub-systems which can communicate with the processor over common channels. For example, the system may comprise a number of sub-systems including magnetic tape units, magnetic drum storage units, paper tape punches, alphanumeric devices, etc. Preferably each of these sub-systems is equipped to operate independently of the processor, once the sub-system has been provided with its own program data by the processor. For example, the sub-systems may be provided with control registers which are loaded with control digits by the processor, and which thereafter serve automatically and independently, by means of associated logic circuitry, to direct the functioning of the sub-system in such a way that the sub-system transmits selected stored data back to the processor for computation purposes.

In the improved data processing system to be described hereinafter, there is provided means for programmatically controlling the relationship of the several sub-systems and/or terminal devices operating in conjunction with each of several processors. With this arrangement, a large variety of functionally independent sub-systems are interchangeably connectible to the processors under control of the processor programs. Thus, the sub-systems and/or terminal devices can be independently connected, disconnected, and reconnected, to meet continuously varying processing requirements, whereby the system automatically assumes the optimum configuration needed to handle any given problem. Moreover, this program-controlled switching of functionally independent "modules" permits ready expansion of the system, while still retaining operating reliability and simultaneous multi-problem processing capability.

The method of the present invention makes use of electronic interlock apparatus and associated logic circuitry incorporated in each of the sub-systems. The function of this apparatus is to enable each processor to "seize" any one or more sub-systems when required by the processor program. Upon seizure of a sub-system, the interlock means become effective to prevent any of the remaining processors from interfering with the operation of the seized equipment. When the function of the sub-system has been completed, it reverts to an idle mode and the controlling processor may release it for access by any of the other processors.

It also is sometimes desirable for a processor to maintain access to several storage devices of the same class, e.g., magnetic drums, to assure rapid completion of a transaction involving data in the several devices. In the system described herein, interlock selector means is provided to permit a processor to "hold" one or more such devices while permitting communication between the processor and still another of the devices. The interlock selector means assures that access to a device so held cannot be gained by any other processor until that device is released by the holding processor.

The system is thus controlled to match processing capability to each problem and only for the time necessary to do the job. Full system capacity may be concentrated upon a very large problem when needed. This capacity may also be apportioned among a number of smaller problems for simultaneous processing, for system maintenance, etc., when it is not needed for maximum system effort.

Accordingly, it is an object of the present invention to provide a data processing system which is superior to those used heretofore. Another object of the present invention is to provide a data processing system which is capable of automatically organizing itself under programmatic control. A still further object of the present invention is to provide a data processing system wherein the most efficient and economical arrangement of equipment applied under programmatic control to a given problem. Yet another object of the invention is to provide improved apparatus for interconnecting a central data processor and various sub-systems and/or terminal devices. Other objects, advantages and aspects of the present invention will in part be apparent from, and in part pointed out in, the following description considered together with the accompanying drawings, in which:

Figure 1:
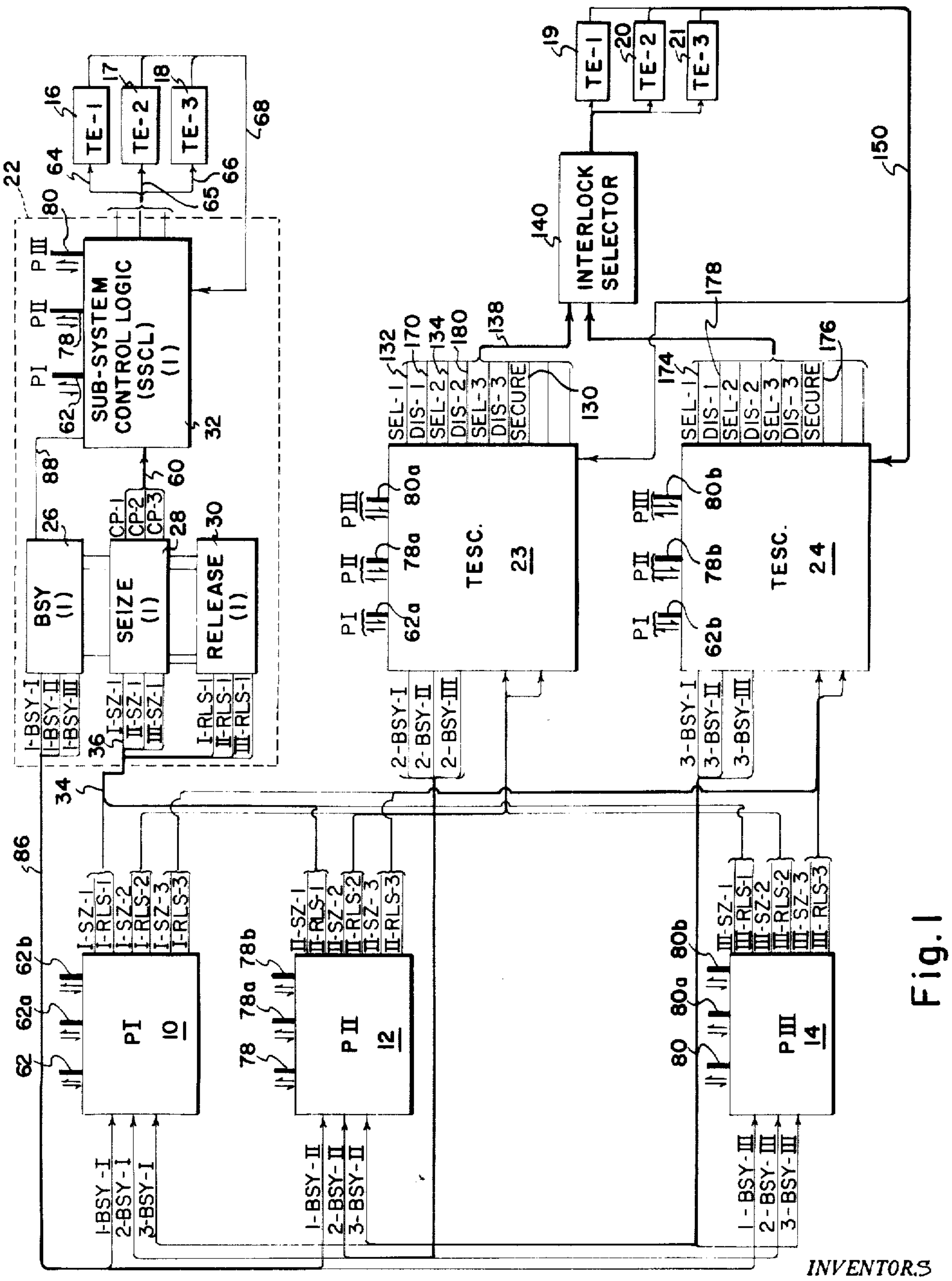
FIGURE 1 is a block diagram of data processing system in accordance with the present invention.

Referring now to FIGURE 1, the system comprises three independent data processors 10, 12 and 14, each capable of performing a variety of arithmetic, control and transfer operations in accordance with its own independent internal program. These processors are of conventional construction and may, for example, be connected through seekers (or "finders") to controlling agents sets by means of which inquiries can be made regarding the availability of airline seats and the like. During the execution of the various programs, each processor will require access to one or more of the terminal equipments 16 through 21 which, in the embodiment to be described, are magnetic drum units. However, the invention is applicable with a large variety of terminal equipments such as magnetic tape units, automatic typewriters, punched card equipment, teletype equipment, paper tape punches and readers, etc. The type and quantity of terminal devices used is optional and can be expanded as system requirements change.

The operation of any of the processors 10, 12, 14 in establishing connections to the terminal equipments 16 through 21 is controlled by the instructions contained in the processor memory, these instructions being part of the processor program for solving a given problem. When the processor is instructed to gain access to a particular terminal equipment, conventional means in the processor are activated for testing whether the sub-system of that particular terminal equipment is busy. If it is busy, the processor will, in accordance with its stored program, "branch" to another instruction. If the sub-system is not busy, a "seize" order is developed to establish the required connection between the processor and the sub-system. As soon as the sub-system function is completed, the equipment may be released by the controlling processor in accordance with a further instruction in its program.

In order to establish connection between the processors 10, 12 and 14 and the various terminal equipments 16 through 21, there are provided "Terminal Equipment Sub-System Controls" referred to herein as TESC 22 through 24. All of the TESC's are fundamentally identical, and therefore the basic elements of only one TESC (22) are shown in FIGURE 1. Each TESC comprises busy circuits 26, seize circuits 28, release circuits 30 and a sub-system control logic (SSCL) 32.

Figure 2:
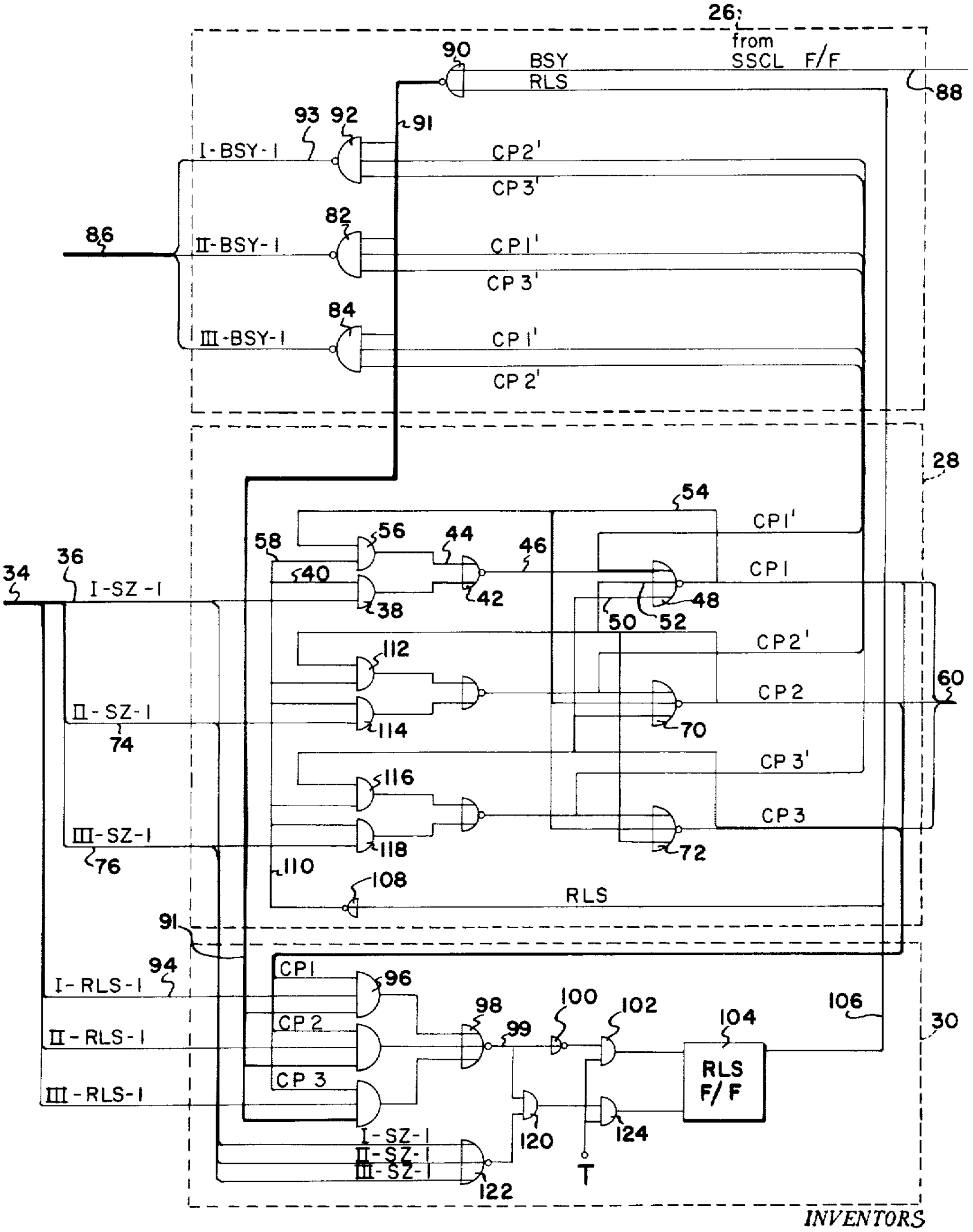
FIGURE 2 is a schematic diagram of certain portions of the system shown in FIGURE 1.

When processor 10, for example, requires access to one of the terminal equipments 16 through 18, it will transmit a seize signal through cable 34, lead 36, to the seize circuits 28 of TESC 22. Referring now to FIGURE 2, which shows details of TESC 22, the seize signal on lead 36 is applied as a "high" input (logical one) to an AND gate 38, the other input 40 of which also is high as will be explained subsequently. The resulting high output of AND gate 38 is directed to an Inverter-OR gate 42 the other input 44 of which is initially low, or logical zero. (Note: An Inverter-OR gate is defined as a circuit the output of which is high only when all of its inputs are low.) Consequently, when the output of AND gate 38 goes high, the output line 46 of Inverter-OR gate 42 changes from high to low.

The output line 46 of Inverter-OR gate 42 serves as one input to a second Inverter-OR gate 48, the other two inputs 50, 52 of which are normally low. Thus, when output line 46 goes low, the output line CP1 of gate 48 changes from low to high. This high output also is directed through a feedback lead 54 to an 9 AND gate 56 the other input 58 of which is high at this time. The resulting high output of gate 56 is fed through lead 44 to the input of Inverter-OR gate 42, thereby assuring that its output line 46 remains low after the seize signal fed through AND gate 38 ceases. Normally this seize signal lasts only for one operating cycle of the processor 10 (which typically will be only ten or so microseconds), and the feedback loop through lead 54 and AND gate 56 serves to "lock up" TESC 22 until it has been positively released by the processor 10.

The high output on lead CP1 is transmitted through a cable 60 to the sub-system control logic 32 (FIGURE 1), and operates (by means of conventional switching circuitry not shown) to connect this logic circuit through a comumnication cable 62 back to the processor 10. When this cable connection is completed, the processor can then transmit therethrough to SSCL 32, under programmatic command, a series of control digits which are stored in a control register (not shown) for directing the further operations of the particular sub-system. Certain of these control digits identify the particular one of the three terminal equipments 16, 17 or 18 to which access is desired, and the pertinent decoding and logic elments or SSCL 32 establish connection to that equipment through lines 64, 65 or 66. Other control digits loaded in the SCCL control register serve in the usual way to identify the addresses of the desired data stored in the selected terminal equipment (i.e., data representing the number of seats remaining in a given airline flight), and to control the retrieval of this data from the terminal equipment. The data so retrieved is fed back along a line 68 to the SSCL 32, which may include conventional buffer storage means to temporarily store the retrieved data for subsequent retransmission to the processor 10 through corresponding leads in the cable 62. Sending of data in the oposite direction, i.e. to the terminal equipment, is of course also possible by the same means.

While this data transfer operation is taking place, access to the terminal equipments 16, 17 or 18 is denied to the other processors 12 or 14. Referring particularly to FIGURE 2, it will be seen that the feedback lead 54, which is high at this time, is connected to the inputs of Inverter OR gates 70 and 72 (corresponding to the Inverter-OR gate 48 of the sub-circuit assigned to processor 10), and serves as an interlock for the sub-circuits assigned to processors 12 and 14 respectively. Consequently, the output lines CP2 and CP3 of these gates will remain low even though seize signals are applied to input lines 74 or 76 of these other sub-circuits by the processors 12 or 14 respectively. With the output lines CP2 and CP3, there can be no connection established between the SSCL 32 and the processors 12 or 14, through the interconnection cables 78 or 80.

The busy circuits 26 also are conditioned at this time to return a "busy" indication to the processors 12 or 14 should either carry out a "test for busy" instruction. For this purpose, the output line 46 of the Inverter-OR gate 42 is connected through a line CP1' to the inputs of Inverter-AND gates 82 and 84 forming part of the busy circuits. (Note: An Inverter-AND gate is defined as a circuit the output of which is low only when all of its inputs are high.) Since line CP1' is low at this time, the outputs of gates 82 and 84 will be high. The high outputs of these gates are transmitted through a cable 86 to the respective processors 12 and 14 to provide a busy indication thereto.

The sub-system control logic (SSCL) 32 also includes a "busy flip-flop" (not shown) which by conventional means is triggered to its "set" state as soon as the processor 10 starts to transfer control digits to the SSCL, and remains set during the operation of the sub-system associated with this transfer. The resulting high output of this flip-flop is connected along a lead 88 (BSY) to an Inverter-OR gate 90 in the busy circuits 26, so that the output of this gate 90 remains low during the time that the selected sub-system is operating to transfer data between the processor 10 and any of the terminal devices 16, 17 or 18.

The output line 91 of gate 90 is connected to an Inverting-AND gate 92 (as well as to the inputs of the two Inverting-AND gates 82 and 84 corresponding to processors 12 and 14). Consequently, the output 93 of gate 92 will remain high while the sub-system is in operation, and this high output will be transmitted through cable 86 back to the processor 10 so that it will receive a busy signal if, during the execution of its internal program, it should again attempt to gain access to the sub-system before the previous instruction has been completed.

When the sub-system completes the data transfer defined by the instruction, it enters an idle mode thereby "resetting" the busy flip-flop so that the output lead 88 (BSY) goes low. If at this time the other input to Inverter-OR gate 90 also is low (as will be explained), output line 91 will present a high input to the Inverter AND gate 92. The other inputs CP2' and CP3' to this gate 92 also will be high since processors 12 and 14 are not connected to this subsystem. Therefore, the output 93 of gate 92 will go low, so that the sub-system now appears "not busy" to processor 10 and again is available to this processor (but not to processors 12 and 14) for further transfer operations.

If processor 10 no longer requires connection to this sub-system, TESC 22 will be released for reassignment to the other processors as needed. For this purpose, the processor 10, following its internal program, places a high signal on a release output line 94 which is connected through cable 34 to the input of an AND gate 96 in the release circuits 30. The other two inputs CP1 and 91 to this gate 96 also are high at this time, since the subsystem is connected to processor 10 and is in its idle mode. Consequently, the output of AND gate 96 goes high and thereby causes the output 99 of an Inverter-OR gate 98 to go low.

The low output 99 of this gate 98 passes through an Inverter 100 to produce a high signal which is applied to an AND gate 102 together with periodic clock pulses T from the main clock pulse generator (not shown) of the data processing system. When the next clock pulse arrives, the output of the AND gate 102 goes high and "sets" a release flip-flop 104, thereby causing its output lead 106 to go high. This high output is connected to an inverter 108, the output lead 110 of which goes low to close AND gates 38 and 56 (as well as the corresponding AND gates 112, 114, 116 and 118). With the closure of AND gate 56, the feedback loop from lead 54 is interrupted, so that output line 46 of gate 42 goes high and control line CP1 goes low. Thus the SSCL 32 is disconnected from processor 10. The feedback lead 54, now having gone low, no longer interlocks other Inverter-OR gates 70 and 72, so that the SSCL may be connected to either of the other processors 12 and 14.

The release signal on line 94 lasts only a short time, and when this line again goes low, AND gate 96 will be closed so that the output 99 of Inverter-OR gate 98 will go high. This high output is connected to another AND gate 120 together with the output from an Inverter-OR gate 122 controlled by the seize signals from the three processors 10, 12 and 14. Assuming that none of these processors is at the moment attempting to seize the subsystem, the output of gate 122 will be high, so that AND gate 120 will direct a high signal to another AND gate 124 which also is fed clock pulses T. Accordingly, upon the occurrence of the next clock pulse, the output of gate 124 will go high to reset the release flip-flop 104 and cause its output lead 106 to go low. The output of inverter 108 thereupon goes high to prime the various AND gates 38, 56, 112, 114, 116 and 118 to permit seizure of the sub-system by the processors 10, 12 or 14 upon energization of the appropriate seize leads 36, 74 or 76.

The output lead 106 of the release flip-flop 104 also is connected to the input of Invertor-OR gate 90 so that, when this flip-flop has been reset, the output line 91 of gate 90 will be high. Since, in the assumed conditions, none of the three processors has as yet established connection to the sub-system, lines CP1', CP2' and CP3' will also be high. Therefore, the outputs of the Inverter-AND gates 82, 84 and 92 all will be low. Accordingly, if any processor carries out a "test for busy" instruction, the results will be negative, and that processor will thereupon "seize" the sub-system in the manner described hereinabove.

It sometimes is desirable for a processor to reserve access to, i.e., "hold," one or more terminal equipments of a particular class, although the processor may at the time be communicating with one of the other terminal equipments of that class. However, it also is desirable to permit seizure by different processors of still other (i.e., non-reserved) terminal equipments of that same class. These features are provided by an interlock selector means now to be described.

Referring again to FIGURE 1, let it be assumed that processor 12 requires access to terminal equipments 19 and 20, in that order, but that after having completed its operations with terminal equipment 20, it again will require access to terminal equipment 19. Processor 12 first will seize terminal equipment sub-system control (TESC) 23, in the manner described hereinabove with reference to TESC 22. After seizure of this equipment, the processor 12 will transmit the required control digits to the control register of TESC 23, and when all digits have been transferred the decoding circuitry associated with the control register will energize the "select digit" lead 132 which passes through cable 138 to an interlock selector 140. Also, a "secure" lead 130 is momentarily energized in the nature of a "start" signal, to initiate data transfer operations with the selected terminal equipment.

Figure 3:
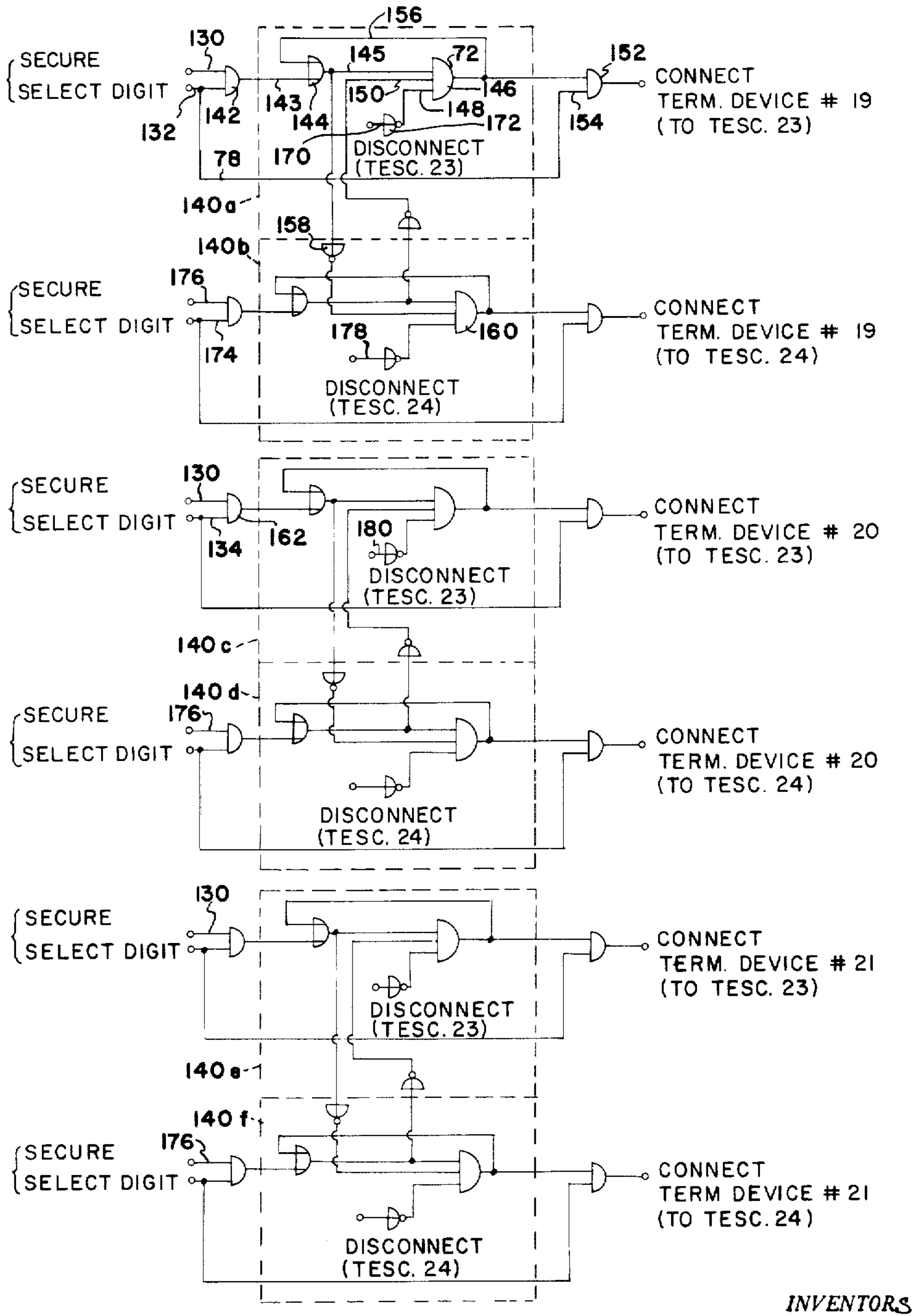
FIGURE 3 is a schematic diagram of other portions of the system shown in FIGURE 1.

Referring now to FIGURE 3, which shows details of interlock selector 140, energization of lines 130 and 132 opens an AND gate 142 forming part of a sub-circuit, indicated in dashed outline **140*a*, which serves to establish connection between TESC 23 and terminal equipment 19. The interlock selector also includes sub-circuit 140*b*, for connecting terminal equipment 19 to TESC; sub-circuit 140*c* for connecting TESC 23 to terminal equipment 20; sub-circuit 140*d* for connecting terminal equipment 20 to TESC 24; sub-circuit 140*e* for connecting terminal equipment 21 to TESC 23; and sub-circuit 140*f* for connecting terminal equipment 21 to TESC 24**.

The high output 143 of gate 142 passes through an OR gate 144 and along a lead 145 to another AND gate 146. As will be apparent from the discussion hereinbelow, the other two inputs 148 and 150 to this latter AND gate will be high at this time, so that the gate opens and transmits a high signal to an output AND gate 152. This gate 152 has a second input 154 which is connected directly to the incoming line 132, so that AND gate 152 opens and provides a high output signal to conventional switching circuitry (not shown) for the terminal equipment 19. This switching circuitry is effective to connect the terminal equipment through a cable 150 (FIGURE 1) to TESC 23 for the transfer of control signals and stored data therebetween, as described hereinabove with reference to TESC 22.

After these operations have been completed with terminal equipment 19, the processor 12 will, in accordance with its stored program, transmit additional control digits to the control register of TESC 23. Assuming that these instructions require access to terminal equipment 20, lead 132 will go low, and "select digit" lead 134 will go high. Thus, AND gate 152 closes, and the terminal equipment 19 is disconnected from TESC 23. However, this terminal equipment is "held" for future use by TESC 23, in that access still is denied to TESC 24.

This "hold" function results from the feedback lead 156 which extends from the output of AND gate 146 to the input of OR gate 144, and serves to lock up this latter gate. Thus, the OR gate output 145 remains high after its input 143 has gone low with the closure of AND gate 142. The high output 145 is directed through an inverter 158 to produce a low signal at the input of an AND gate 160. This latter gate forms part of the sub-circuit 140*b* (for connecting terminal equipment 19 to TESC 24) and corresponds in function to gate 146 previously discussed. Accordingly, it will be apparent that the low input from inverter 158 maintains gate 160 closed, and terminal equipment 19 therefore cannot be connected to TESC 24, even though TESC 23 is not at the moment communicating with this terminal equipment.

In the meantime, the secure lead 130 has again momentarily gone high, to signal the start of operations with terminal equipment 20. This opens AND gate 162 of sub-circuit 140*c* which, in a manner explained above, connects terminal equipment 20 to TESC 23. Accordingly, transfer of data through cable 150 between this terminal equipment and TESC 23 (and ultimately processor 10) can be effected in accordance with the instructions in the TESC control register. After this transfer has been completed, another set of control digits will be loaded into the control register by processor 12, for the purpose of resuming operations with terminal equipment 19.

At any time during these operations, processor 14 can gain access to terminal equipment 21 through TESC 24, because sub-circuit 140*e* is not locked up, and hence sub-circuit 140*f* is available for completing the connection to that terminal equipment. However, processor 14 cannot gain access to terminal equipments 19 or 20 if they are being "held" as described, or if they are in process of transferring data to TESC 23.

It also will be apparent from the showing in FIGURE 3 that the various sub-circuits 140*a*, 140*b*, etc., are mutually interlocked. Thus, while TESC 23 is connected to terminal equipment 19 by sub-circuit 140*a*, TESC 24 cannot gain access to this terminal equipment. However, if TESC 24 has been first connected to terminal equipment 19 through sub-circuit 140*b*, sub-circuit 140*a* is prevented from connecting this equipment to TESC 23.

When the processor 12 has completed its operations with either of the seized terminal equipments 19 or 20, it may release that equipment for use by another processor. For this purpose, and with reference for example to equipment 19, TESC 23 will (in accordance with its stored instructions) produce on lead 170 a high "disconnect" signal which is directed to an inverter 172 forming part of sub-circuit 140*a*. The resulting low output 148 of this inverter closes AND gate 146, thereby causing feedback lead 156 to go low and close OR gate 144 (since its other input 143 also is low at this time). This interrupts the lock-up of sub-circuit 140*a*, which thereupon reverts to its normal de-activated state, and at the same time removes the interlock from sub-circuit 140*b*, because the output of inverter 158 goes high to prime the AND gate 160. Thus, sub-circuit 140*b* now is in condition to establish a connection between terminal equipment 19 and TESC 24, should the latter transmit the required select and secure signals on leads 174 and 176.

Although a preferred embodiment of the invention has been set forth in detail, it is desired to emphasize that this is not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invetion as limited by the prior art.

We claim:

1. Data processing apparatus comprising, in combination, a plurality of separate and independent data processors each including program-controlled arithmetic means; a group of terminal equipments to which said processors may require access during the execution of particular programs stored in the processors; at least two sub-system control units for controlling communication between said group of terminal equipments and all of said data processors, first circuit means connecting each of said control units to all of said processors; said processors including means for directing to any selected control unit seize signals to initiate communication with any of said group of terminal equipments; first interlock means for preventing the concurrent establishment of communication channels from either of said control units to more than one of said data processors; second circuit means connected between said group of terminal equipments and both of said control units for establishing communication between any of said terminal equipments and either of said control units so as to permit a transfer of data between the selected terminal equipment and the data processor which seized the corresponding control unit; second interlock means forming part of said second circuit means, said second interlock means including means responsive to signals from either one of said control units for preventing communication between the other one of said control units and any selected terminal equipment of said group of terminal equipments, whereby said one control unit can reserve at least one of said terminal equipments for subsequent communication with the processor which seized that control unit; and release means actuable by a signal produced in accordance with the processor program, said release means being operable to deactivate said second interlock means and thereby permit access to the reserved terminal equipment by said other processors.

2. Apparatus as claimed in claim 1, wherein said second circuit means comprises a plurality of sub-circuits respectively for connecting any of said terminal equipments individually to either of said control units; said second interlock means including means operable, when one sub-circuit has been activated by its corresponding control unit, to disable all of the other sub-circuits leading to the terminal equipment corresponding to the activated sub-circuit, whereby that terminal equipment is reserved for subsequent communication with said corresponding control unit.

References Cited by the Examiner

UNITED STATES PATENTS

| | | | |
|---|---|---|---|
| 1,927,556 | 9/1933 | Nelson | 340—147 |
| 2,741,665 | 4/1956 | Oberman | 179—18 |
| 2,813,929 | 11/1957 | Oberman | 179—18 |
| 3,012,227 | 12/1961 | Astrahan et al. | 340—172.5 |
| 3,029,414 | 4/1962 | Shrimpf | 340—172.5 |
| 3,063,036 | 11/1962 | Reach et al. | 340—172.5 |

OTHER REFERENCES

Ferrell, E. B., A Terminal for Data Transmission over Telephone Circuits, in the Proceedings of the Western Joint Computer Conference, pages 31–33 February 7–9, 1956.

Matlack, R.C., The Role of Communications Networks in Digital Data Systems, in the Proceedings of the Eastern Joint Computer Conference, pages 83–86, November 7–9, 1955.

ROBERT C. BAILEY, *Primary Examiner.*

IRVING L. SRAGOW, MALCOLM A. MORRISON, *Examiners.*

L. W. MASSEY, P. L. BERGER, *Assistant Examiners.*